United States Patent [19]

Ohta et al.

[11] Patent Number: 5,744,259

[45] Date of Patent: Apr. 28, 1998

[54] NICKEL POSITIVE ELECTRODE FOR ALKALINE STORAGE BATTERY AND SEALED NICKEL-METAL HYDRIDE STORAGE BATTERY

[75] Inventors: Kazuhiro Ohta; Yukihiro Okada; Kiyoshi Hayashi, all of Neyagawa; Hiromu Matsuda, Kawabe-gun; Yoshinori Toyoguchi, Yao, all of Japan

[73] Assignee: Matsushita Electric Industrial Co., Ltd., Osaka-fu, Japan

[21] Appl. No.: 646,824

[22] Filed: May 21, 1996

[30] Foreign Application Priority Data

May 25, 1995 [JP] Japan ................................ 7-126574
Jun. 16, 1995 [JP] Japan ................................ 7-150522

[51] Int. Cl.[6] .................................................. H01M 10/30
[52] U.S. Cl. ........................... 429/59; 429/101; 429/206; 429/223
[58] Field of Search ............................. 429/223, 218, 429/101, 232, 54, 57, 206, 59; 420/900

[56] References Cited

U.S. PATENT DOCUMENTS

| | | |
|---|---|---|
| 4,603,094 | 7/1986 | Yasuda . |
| 4,844,948 | 7/1989 | Nakahori et al. . |
| 4,975,035 | 12/1990 | Kuklinski et al. . |
| 5,079,110 | 1/1992 | Nakahori et al. . |
| 5,200,282 | 4/1993 | Ohnishi et al. . |
| 5,348,822 | 9/1994 | Ovshinsky et al. . |
| 5,441,833 | 8/1995 | Furukawa . |
| 5,506,070 | 4/1996 | Mori et al. ................................ 429/59 |
| 5,523,182 | 6/1996 | Ovshinsky et al. ..................... 429/223 |

FOREIGN PATENT DOCUMENTS

| | | |
|---|---|---|
| A1-0 571 630 | 12/1993 | European Pat. Off. . |
| 62-066570 | 3/1987 | Japan . |
| 63-152866 | 6/1988 | Japan . |

*Primary Examiner*—Anthony Skapars
*Attorney, Agent, or Firm*—Panitch Schwarze Jacobs & Nadel, P.C.

[57] ABSTRACT

A nickel positive electrode for an alkaline storage battery having an improved utilization is disclosed. It comprises a nickel hydroxide powder and a cobalt hydroxide powder, wherein the cobalt hydroxide powder has a specific surface area of 10 $m^2/g$ or larger and a particle diameter of one-half or less of that of the nickel hydroxide powder. A nickel-metal hydroxide storage battery having this nickel positive electrode is also disclosed.

5 Claims, 1 Drawing Sheet

NICKEL POSITIVE ELECTRODE FOR ALKALINE STORAGE BATTERY AND SEALED NICKEL-METAL HYDRIDE STORAGE BATTERY

BACKGROUND OF THE INVENTION

1. Field of the Invention

The present invention relates to a nickel positive electrode for an alkaline storage battery, a sealed-type nickel-metal hydride storage battery, and a method for charging the battery.

2. Description of the Prior Art

The alkaline storage battery is a secondary battery comprising a positive electrode configured with a nickel oxide or a nickel hydroxide, a negative electrode configured with a hydrogen storage alloy capable of electrochemically absorbing and desorbing hydrogen in a reversible manner, an oxide or a hydroxide of cadmium, iron or zinc or the like, and an electrolyte prepared with an alkaline aqueous solution. A wider application of such alkaline storage battery has been expected, ranging from the batteries of large or medium capacity for electric vehicles to those of small capacity for small electric or electronic appliances such as portable telephone. In either case, an improvement in the utilization of its positive electrode (a ratio of actual capacity of the produced positive electrode to the theoretical positive electrode capacity) is imperative for realizing the expected broadening of the applications.

In order to improve the utilization of the nickel positive electrode, there have been various proposals on methods to add cobalt, but each proposal has its own specific problem. For instance, a method of adding metal cobalt (Japanese Raid-open Patent Publication No. Sho 55-14666) is not practical, because the metal cobalt to be added is expensive and oxidized from its valence 0 to its valence 3 by charging. This makes it necessary to combine the positive electrode with a negative electrode having an excessive capacity, which offsets the quantity of electricity required for charging but hinders the attainment of the expected higher capacity of the battery. In another proposal including a method of adding cobalt monoxide (Japanese Raid-open Patent Publication No. Sho 61-138458), it entails a complicated manufacturing process because the cobalt monoxide is unstable and immediately oxidized by the oxygen in the air, and the manufactured battery has a disadvantage of requiring a stand-still period for 20 hours or longer in advance to its initial charge. Still another method for adding CoO, β-Co(OH)$_2$ or α-Co(OH)$_2$ (Japanese Raid-open Patent Publication No. Sho 62-256366) has a disadvantage that the crystal structure of these compounds must be regulated.

SUMMARY OF THE INVENTION

The primary object of the present invention is to provide a nickel positive electrode having an excellent utilization which has overcome the disadvantages and obviated the deficiencies inherent to the above-mentioned conventional methods of adding the cobalt component.

Another object of the present invention is to provide a sealed-type nickel-metal hydride storage battery having a longer cycle life and a higher capacity, provided with the above-mentioned nickel positive electrode.

The present invention provides a nickel positive electrode for an alkaline storage battery comprising a nickel hydroxide powder and a cobalt hydroxide powder, wherein the cobalt hydroxide powder has a specific surface area of 10 m$^2$/g or larger and a particle diameter of one-half (½) or less of that of the above-mentioned nickel hydroxide powder.

Throughout the present specification and claims, both of the nickel hydroxide particles and the cobalt hydroxide particles are described to mean an aggregate of primary particles, namely, secondary or tertially particles. The primary particles (of minimum size level) of the cobalt hydroxide have a particle diameter of about 0.1–0.2 μm and their aggregates have a particle diameter of about 1–5 μm. By contrast, the average particle diameter of the nickel hydroxide is about 10 μm.

In the above-mentioned nickel positive electrode for an alkaline storage battery comprising an active material of a nickel hydroxide powder which is added with a cobalt hydroxide powder, the present invention uses an electrode wherein the surfaces of the particles of the above-mentioned nickel hydroxide are covered with particles of the above-mentioned cobalt hydroxide powder having a specific surface area of 10 m$^2$/g or larger and a particle diameter of one-half (½) or less of that of the above-mentioned nickel hydroxide powder.

In the above-mentioned nickel positive electrode for an alkaline storage battery, the above-mentioned cobalt hydroxide powder has preferably been subjected to an anti-oxidation treatment or oxidation prevention treatment.

Preferably, the above-mentioned nickel positive electrode for an alkaline storage battery further comprises at least one member selected from the group consisting of a metal nickel powder, a carbon powder and a metal cobalt powder.

It is more preferable from the viewpoint of uniform filling and formation of an electrically conductive network that the above-mentioned nickel hydroxide is in spheric shape having an average particle diameter of 1–30 μm.

The present invention also provides a sealed-type nickel-metal hydride storage battery comprising a nickel positive electrode which contains a nickel hydroxide powder and a cobalt hydroxide powder, wherein the above-mentioned cobalt hydroxide powder has a specific surface area of 10 m$^2$/g or larger and a particle diameter of one-half (½) or less of that of the nickel hydroxide powder, a negative electrode which comprises a hydrogen storage alloy capable of electrochemically absorbing and desorbing hydrogen in a reversible manner, a separator, an electrolyte of an alkaline aqueous solution, and a sealed battery case provided with lead conductor members for connecting the electrodes to terminals and a resettable safety valve.

The present invention is also directed to a method for charging a sealed-type nickel-metal hydride storage battery comprising standing the storage battery still for 20 hours or longer after its assembly, and performing initial charging thereafter.

In the method for charging a sealed-type nickel-metal hydride storage battery, it is preferable to perform initial charging at a current of ½ CA or less, calculated on a basis of a quantity of electricity for oxidizing Co(II) of the cobalt hydroxide to Co(III) in the oxidation region of the cobalt hydroxide, followed by charging of the battery at an equal or a higher rate than the initial value.

While the novel features of the invention are set forth particularly in the appended claims, the invention, both as to organization and content, will be better understood and appreciated, along with other objects and features thereof, from the following detailed description taken in conjunction with the drawing.

DETAILED DESCRIPTION OF THE PREFERRED EMBODIMENTS

Figure 1:
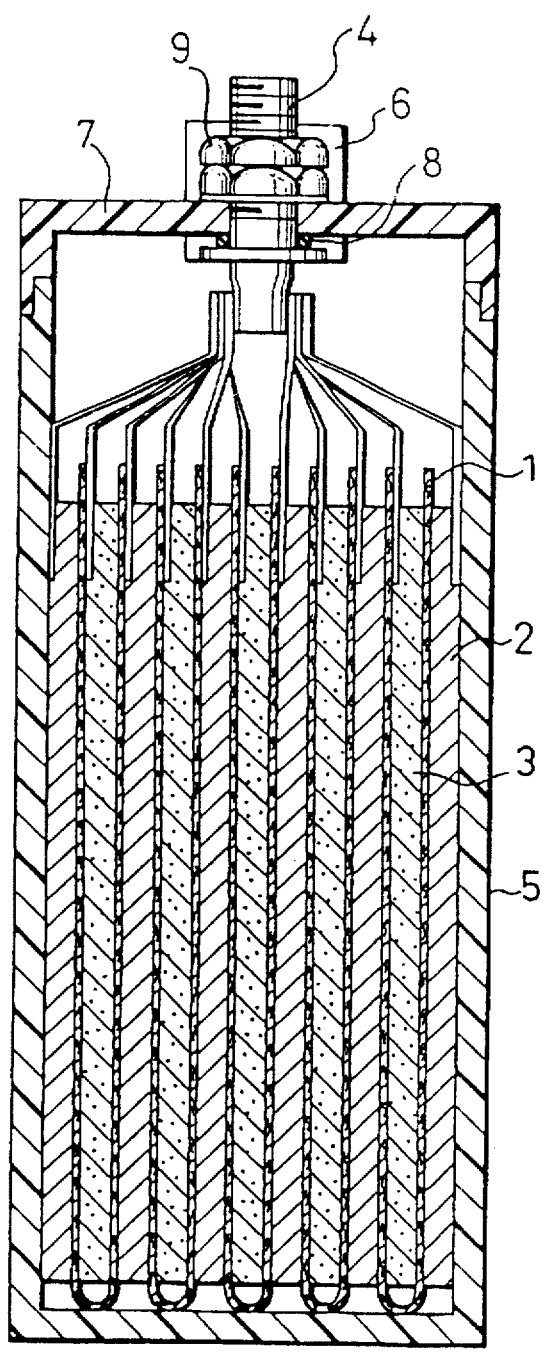
FIG. 1 is a longitudinal cross-sectional view of an alkaline storage battery of an embodiment in accordance with the present invention.

As has been described previously, the nickel positive electrode for an alkaline storage battery of the present invention is configured by incorporating a cobalt hydroxide powder which has a specific surface area of 10 m²/g or larger and a particle diameter of one-half (½) or less of that of the above-mentioned nickel hydroxide powder into the nickel positive electrode. With the increase in the specific surface area of the cobalt hydroxide to be added to the positive electrode, oxidation efficiency of the cobalt hydroxide during initial charging increases, and the cobalt hydroxide tends to increasingly produce CoOOH having a high electroconductive property.

In addition, the smaller the ratio of the particle diameter of the cobalt hydroxide powder to the particle diameter of the nickel hydroxide powder is, the larger the portion of the cobalt hydroxide in contact with a particle of the nickel hydroxide powder becomes. Since the CoOOH produced on the surfaces of the particles of the nickel hydroxide serves as the electrically conductive network between the nickel hydroxide and a collector, the utilization of the nickel positive electrode is improved. The improvement in the utilization of the nickel positive electrode is remarkable in particular when a cobalt hydroxide powder which has a specific surface area of 10 m²/g or larger and a particle diameter of one-half (½) or less of that of the above-mentioned nickel hydroxide powder is incorporated into the electrode.

When the surfaces of the particles of the above-mentioned nickel hydroxide are covered with particles of the above-mentioned cobalt hydroxide powder, the portion of the cobalt hydroxide in contact with the nickel hydroxide increases. In addition, since the CoOOH produced on the surfaces of the particles of the nickel hydroxide serves as the electrically conductive network between the nickel hydroxide and the collector, the utilization of the nickel positive electrode is improved. The improvement in the utilization of the nickel positive electrode is remarkable in particular when the surfaces of the particles of the nickel hydroxide powder are covered with the particles of the cobalt hydroxide powder which has a specific surface area of 10 m²/g or larger and a particle diameter of one-half (½) or less of that of the above-mentioned nickel hydroxide powder.

Although cobalt hydroxide is stable in the air, it may sometimes become unstable depending on the manufacturing process employed therefor. Therefore, the cobalt hydroxide can safely be used as a stable material if only anti-oxidation treatment is applied thereto.

If the configured storage battery is stood still after its assembly until initial charging, the incorporated cobalt hydroxide first dissolves in the electrolyte and then precipitates again on the surfaces of the particles of the nickel hydroxide as the active material, thereby to increase the amount of the cobalt hydroxide which covers the surfaces of the particles of the nickel hydroxide. In this manner, the previously-mentioned electrically conductive network of the CoOOH is produced more effectively.

When initial charging is performed at a small current value, a charge acceptance by the cobalt hydroxide is improved and the cobalt hydroxide is satisfactorily oxidized even if the cobalt oxide has a small specific surface area, and the CoOOH is produced. In the oxidation region of the cobalt hydroxide in particular, a remarkable advantage in this respect is obtained when the battery is charged at a current of ½ CA or smaller, calculated on a basis of the quantity of electricity for oxidizing Co(II) of the cobalt hydroxide to Co(III) in the oxidation region of the cobalt hydroxide.

In the following paragraphs, the present invention will be described in more detail with reference to its specific examples.

EXAMPLE 1

In this example a nickel hydroxide powder having an average particle diameter of 10 μm was employed in combination with each cobalt hydroxide powder having an average particle diameter of ⅒, ⅕, ⅓, ½ or 1 of the average particle diameter of the nickel hydroxide powder and a specific surface area of 5, 10, 30 or 100 m²/g determined according to BET method as listed in Table 1 below.

First, the above-mentioned nickel hydroxide powder and each cobalt hydroxide powder were weighed in a proportion by weight of $Ni(OH)_2 : Co(OH)_2 = 100:10$, and the mixture was added with water to prepare a paste. The paste was filled into a foamed nickel substrate having a width of 60 mm, a length of 81 mm and a weight of 3.1 g, and the filled substrate was dried at 80° C. and pressure-molded to a thickness of 1.74 mm to produce a positive electrode plate. A nickel plate as a lead conductor was spot-welded to a corner of this positive electrode plate. Five (5) sheets of the positive electrode were employed in each of the test cells.

Separate from this, an $AB_5$-type alloy represented by the formula $MmNi_{3.55}Mn_{0.4}Al_{0.3}Co_{0.75}$ containing misch metal (Mm) which includes 10 wt % lanthanum was employed as a hydrogen storage alloy for the negative electrode. By adding water to 19.4 g of this alloy, a paste was obtained. The paste was filled into a foamed nickel substrate having a width of 60 mm, a length of 81 mm and a weight of 3.1 g, and the filled substrate was pressure-molded to a thickness of 1.20 mm after dried to produce a negative electrode plate. A nickel plate as a lead conductor was spot-welded to a corner of this negative electrode plate. Six (6) sheets of the negative electrode were employed in each of the test cells.

As shown in FIG. 1, each of the above-mentioned negative electrodes 2 and each of the positive electrodes 3 were alternately laminated by interposing separators made of sulfonated polypropylene nonwoven fiber between two electrodes of opposite polarity, in a manner that two of the negative electrodes were placed at the outermost positions of the laminated assemblage. The lead conductors of the negative electrodes were spot-welded to a negative terminal 4 made of nickel and the lead conductors of the positive electrodes were spot-welded to a positive terminal (not shown) made of nickel, respectively. The electrode group thus configured was housed in a battery case 5 made of acrylonitrile-styrene copolymer resin having a wall thickness of 3 mm, and an inner height of 108 mm, an inner length of 69 mm and an inner width of 18 mm, and 54 ml of an electrolyte of an aqueous solution of potassium hydroxide having a specific gravity of 1.3 was injected into the battery case housing the electrode group. An open end of the battery case 5 is closed with a sealing member 7 made of acrylonitrile-styrene copolymer resin provided with a safety valve which actuates at 2 atom. by adhering it to the case with an epoxy resin. Thereafter, the positive terminal and the negative terminal 4 were fixed on the sealing member 7. The part of these terminals was gas-tightly sealed by placing an O-ring 8 and squeezing it with a nut 9. In this manner, sealed-type batteries for evaluation were configured.

These batteries were charged at 5-hour rate at 20° C. for 6 hours and then discharged at 5-hour rate until the terminal voltage decreased to 1 V. After repeating this charge/discharge operation for 10 cycles, discharge capacities of the respective batteries were measured at the 10th cycle. Based on the discharge capacity, the ratio of actual capacity of the produced positive electrode to the theoretical capacity of the positive electrode active material of nickel hydroxide, that is, the utilization was calculated for each of the batteries for evaluation. The results of the calculations are summarized in Table 1 below.

TABLE 1

| Ratio of average particle diameters | Specific surface area of cobalt hydroxide ($m^2/g$) | | | |
|---|---|---|---|---|
| | 5 | 10 | 30 | 100 |
| 1/10 | 87 | 98 | 99 | 99 |
| 1/5 | 85 | 97 | 98 | 99 |
| 1/3 | 83 | 97 | 97 | 98 |
| 1/2 | 75 | 95 | 95 | 96 |
| 1 | 55 | 72 | 82 | 85 |

As clearly shown in Table 1 above, the positive electrodes configured with the cobalt hydroxide powder that has a specific surface area of 10 $m^2/g$ or larger and a particle diameter of ½ or smaller of that of the nickel hydroxide powder are most excellent.

EXAMPLE 2

An aqueous solution containing sodium hydroxide in 5 mol/L was combined with another aqueous solution containing cobalt sulfate in 2 mol/L and the combined mixture was stirred well, to form cobalt hydroxide. After rapidly washed with water, the cobalt hydroxide was treated with an aqueous solution of D-glucose as an oxidation inhibition treatment or a treatment for preventing oxidation and then dried. The cobalt hydroxide thus obtained had an average particle diameter of 1 μm and a specific surface area of 150 $m^2/g$ according to the BET method. The cobalt hydroxide which had not been treated with the D-glucose was immediately oxidized and discolored.

A procedure similar to that in Example 1 was followed in preparing a positive electrode with the thus treated cobalt hydroxide and another positive electrode with the cobalt hydroxide without treatment. Then, the utilization of the positive electrodes was calculated based on the discharge capacities derived from the repeated charge/discharge tests conducted under the same conditions as those in Example 1. The calculated utilization is summarized in Table 2 below.

TABLE 2

| | Utilization of positive electrode (%) |
|---|---|
| Treated | 99 |
| Nontreated | 87 |

As clearly shown in Table 2, if the unstable cobalt hydroxide receives an oxidation inhibition treatment, the treated cobalt hydroxide can be used as a stable material.

In addition, if at least one member selected from the group consisting of a metal nickel powder, a carbon powder and a metal cobalt powder is added to the nickel positive electrode, electroconductive properties between the active material and the collector are much improved, thereby to maintain an equivalent performance even with an addition of small amounts of the cobalt hydroxide.

EXAMPLE 3

A nickel hydroxide powder having an average particle diameter of 10 μm was shaken vigorously with an aqueous solution containing cobalt ions in a reaction vessel, and by titrating an alkaline aqueous solution therein, the surfaces of the particles of the nickel hydroxide were covered with a layer of the cobalt hydroxide particles.

By adjusting the temperature and the pH value of the content in the reaction vessel to a range of 20°–60° C. and pH 8–13, it was possible to cover the surfaces of nickel hydroxide particles with the cobalt hydroxides having various particle diameters and various specific surface areas as listed in Table 3 below. However, since the measurements are very difficult on the actual particle diameters and specific surface areas of the cobalt hydroxide in its covering state, the particle diameters and specific surface areas of the cobalt hydroxide separately prepared under the same conditions were measured.

In the above-mentioned manner, each of the nickel hydroxide powders covered with the respective cobalt hydroxide powder having an average particle diameter of ¹⁄₁₀, ⅕, ⅓, ½ or 1 of the average particle diameter of the nickel hydroxide powder and a specific surface area of 5, 10, 50 or 150 $m^2/g$ according to the BET method as listed in Table 3 below was prepared. The weight ratio of the nickel hydroxide Ni(OH)$_2$ to the cobalt hydroxide Co(OH)$_2$ was adjusted to 100:10. By washing the thus obtained nickel hydroxide powders with an aqueous solution of D-glucose, those subjected to an oxidation inhibition treatment of the cobalt hydroxide (Group A) were prepared. Those which had not been subjected to an oxidation inhibition treatment of the cobalt hydroxide (Group B) were also prepared.

First, each of the above-mentioned nickel hydroxide powders was added with water to prepare a paste. The paste was filled into a foamed nickel substrate having a width of 60 mm, a length of 81 mm and a weight of 3.1 g, the filled substrate was dried at 80° C. and pressure-molded to have a thickness of 1.74 mm, thereby to produce a positive electrode plate. A nickel plate as a lead conductor was spot-welded to a corner of this positive electrode plate. Five (5) sheets of this positive electrode were employed in each of the test cells.

For a negative electrode, a hydrogen storage alloy electrode similar to that in Example 1 was employed. Six (6) sheets of this negative electrode were employed in each of the test cells.

Each of the above-mentioned negative electrodes were combined with each of the positive electrodes in a manner similar to that in Example 1, thereby to configure sealed-type batteries for evaluation as shown in FIG. 1.

These batteries were charged at 5-hour rate (⅕ CA) at 20° C. for 6 hours and then discharged at 5-hour rate until the terminal voltage decreased to 1 V. This charge/discharge test was repeated for 10 cycles, and the discharge capacities were measured at the 10th cycle. Based on the measured discharge capacities, the utilization of the nickel positive electrode was calculated for each of the batteries for evaluation. The results of the calculations are summarized in Table 3 below.

TABLE 3

| Ratio of average particle diameter of cobalt hydroxide to that of nickel hydroxide | Utilization of the positiven electrode (%) Specific surface area of cobalt hydroxide (m²/g) | | | |
|---|---|---|---|---|
| | 5 | 10 | 50 | 150 |
| Group A | | | | |
| 1/10 | 87 | 98 | 99 | 99 |
| 1/5 | 85 | 97 | 98 | 99 |
| 1/3 | 83 | 97 | 98 | 98 |
| 1/2 | 75 | 95 | 96 | 97 |
| 1 | 55 | 72 | 82 | 85 |
| Group B | | | | |
| 1/10 | 86 | 98 | 99 | 87 |
| 1/5 | 85 | 97 | 99 | 88 |
| 1/3 | 84 | 96 | 98 | 85 |
| 1/2 | 73 | 94 | 96 | 85 |
| 1 | 57 | 71 | 84 | 84 |

As clearly shown in Table 3 above, the positive electrodes configured with the nickel hydroxide powder covered with the cobalt hydroxide power that has a specific surface area of 10 m²/g or larger and a particle diameter of ½ or smaller of that of the nickel hydroxide powder are most excellent. Since the cobalt hydroxide powders having a large specific surface area are liable to be oxidized, there is a difference in the utilization of the positive electrode by the oxidation inhibition treatment as seen from Table 3 above.

A stability of the cobalt hydroxide which covers the surfaces of the nickel hydroxide particles was therefore confirmed in the following manner. As criteria for the stability, valence of the cobalt in the cobalt hydroxide was measured. As the method for measuring the valence, a method of adding an excessive amount of potassium iodide and then titrating the added mixture with sodium thiosulfate was employed.

Table 4 below summarizes the results of the measurements on the stability of the covering cobalt hydroxide. As clearly shown in Table 4, a simple antioxidation treatment makes the cobalt hydroxide stable and usable as a material.

TABLE 4

| Specific surface area of cobalt hydroxide (m²/g) | Utilization of positive electrode (%) | | Valence of cobalt | |
|---|---|---|---|---|
| | Treated | Nontreated | Treated | Nontreated |
| 10 | 96 | 95 | 2.00 | 2.00 |
| 50 | 97 | 97 | 2.01 | 2.00 |
| 150 | 100 | 89 | 2.01 | 2.12 |

EXAMPLE 4

The surfaces of the particles of a nickel hydroxide powder were covered with a cobalt hydroxide powder having a particle diameter of ½ of the particle diameter of the nickel hydroxide powder and a specific surface area of 10 m²/g so that particles having a proportion of $Ni(OH)_2: Co(OH)_2 = 100:10$ by weight were prepared. The nickel hydroxide thus prepared was subjected to an oxidation inhibition treatment by washing it with an aqueous solution of D-glucose. By employing this nickel hydroxide powder, batteries for evaluation were configured in a manner similar to that in Example 3. The positive electrode capacity of each battery was 25.3 Ah and the quantity of electricity required for oxidizing Co(II) of the cobalt hydroxide to Co(III) was 2.63 Ah.

Periods after the assembly for standing-still the batteries for evaluation were set to 0, 10, 20 and 30 hours, respectively. Each battery was then subjected to an initial charge under varying charging conditions specified below, and then discharged at ⅕ CA until the terminal voltage decreased to 1 V. Thereafter, the respective batteries were subjected to the repeated charge/discharge cycles, whereby they were charged at ⅕ CA up to a charged state which equivalents to 120% of the theoretical capacities of the batteries and discharged at ⅕ CA until the terminal voltages decreased to 1 V.

The conditions for initial charging were such that each battery was charged at a current of 0.88, 1.32, 2.63 or 5.26 A, which corresponds to ⅓, ½, 1 or 2 CA of the quantity of electricity required for oxidizing Co(II) of the cobalt hydroxide to Co(III). After a lapse of the oxidizing region of the cobalt, the charging for each battery was continued at a current of 5.26 A which corresponds to about ⅕ CA, calculated on a basis of the theoretical capacity of the battery, i.e., 25.3 Ah until the charge became equivalent to 120% of the theoretical capacity of the battery. A changeover of the charging current was performed at a time point when the terminal voltage of the battery reached 1.4 V. The utilization of these batteries calculated based on the discharge capacities at the 10th cycle of the charge/discharge test is summarized in Table 5 below.

TABLE 5

| Time period for standing still (hour) | Utilization of positive electrode (%) Current value of the first half of the initial charge (CA) | | | |
|---|---|---|---|---|
| | ⅓ | ½ | 1 | 2 |
| 0 | 99 | 98 | 92 | 90 |
| 10 | 99 | 98 | 93 | 91 |
| 15 | 100 | 99 | 93 | 92 |
| 20 | 100 | 100 | 98 | 95 |
| 30 | 100 | 100 | 99 | 97 |

As clearly seen from Table 5 above, a favorable result is obtained in each of the cases where the time period for standing still is 20 hours or longer and the initial value of the charging current in the initial charge is ½ CA or less. Although no difference was observed in the utilization of the positive electrode when the rest of the initial charge was performed at the same small current value even after termination of charging for the region of the cobalt hydroxide to be oxidated, it is preferable to change the current value for shortening the period of operation.

In addition, if at least one member selected from the group consisting of a metal nickel powder, a carbon powder and a metal cobalt powder is added to the nickel positive electrode, electroconductive properties between the active material and the collector are much improved, thereby to maintain an equivalent performance even with an addition of small amounts of the cobalt hydroxide.

In the foregoing embodiment, although the nickel positive electrode in accordance with the present invention has been described mainly in conjunction with its application to the nickel-metal hydride storage battery, it is needless to say that the disclosed nickel positive electrode can also be applied to the nickel-cadmium storage battery and the like.

As described previously, according to the present invention, it is possible to obtain the nickel positive electrode having an improved utilization and thus to provide the alkaline storage battery having a high performance as well as a high capacity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A nickel positive electrode for an alkaline storage battery comprising a nickel hydroxide powder having its particle surfaces covered with particles of a cobalt hydroxide powder, wherein said cobalt hydroxide powder has a specific surface area of 10 $m^2/g$ or larger and a particle diameter of one-half or less of that of said nickel hydroxide powder.

2. The nickel positive electrode for an alkaline storage battery in accordance with claim 1, wherein said cobalt hydroxide powder has been subjected to an antioxidation treatment.

3. The nickel positive electrode for an alkaline storage battery in accordance with claim 1, further comprising at least one member selected from the group consisting of a metal nickel powder, a carbon powder and a metal cobalt powder.

4. A sealed nickel-metal hydride storage battery comprising:

a nickel positive electrode which comprises a nickel hydroxide powder and a cobalt hydroxide powder, wherein said cobalt hydroxide powder has a specific surface area of 10 $m^2/g$ or larger and a particle diameter of one-half or less of that of said nickel hydroxide powder;

a negative electrode which comprises a hydrogen storage alloy capable of electrochemically absorbing and desorbing hydrogen in a reversible manner;

a separator;

an electrolyte of an alkaline aqueous solution; and a sealed battery case provided with lead conductor members for connecting the electrodes to terminals and a resettable safety valve.

5. The sealed nickel-metal hydride storage battery in accordance with claim 4, wherein the surfaces of the particles of the nickel hydroxide powder in said positive electrode are covered with the particles of said cobalt hydroxide powder.

* * * * *